(12) United States Patent
Ward

(10) Patent No.: US 10,063,662 B2
(45) Date of Patent: Aug. 28, 2018

(54) METHOD AND SYSTEM FOR ESTABLISHING A TRUST ASSOCIATION

(71) Applicant: Twitter, Inc., San Francisco, CA (US)

(72) Inventor: Ben Ward, San Francisco, CA (US)

(73) Assignee: Twitter, Inc., San Francisco, CA (US)

(*) Notice: Subject to any disclaimer, the term of this patent is extended or adjusted under 35 U.S.C. 154(b) by 186 days.

(21) Appl. No.: 14/785,627

(22) PCT Filed: Apr. 18, 2014

(86) PCT No.: PCT/US2014/034703
§ 371 (c)(1),
(2) Date: Oct. 19, 2015

(87) PCT Pub. No.: WO2014/172670
PCT Pub. Date: Oct. 23, 2014

(65) Prior Publication Data
US 2016/0080525 A1    Mar. 17, 2016

Related U.S. Application Data

(60) Provisional application No. 61/814,042, filed on Apr. 19, 2013.

(51) Int. Cl.
*H04L 29/06* (2006.01)
*H04L 29/08* (2006.01)
(Continued)

(52) U.S. Cl.
CPC ............. *H04L 67/42* (2013.01); *G06Q 50/01* (2013.01); *H04L 43/045* (2013.01); *H04L 67/02* (2013.01); *H04L 67/306* (2013.01)

(58) Field of Classification Search
CPC ....... G06Q 50/01; H04L 43/045; H04L 67/02; H04L 67/306; H04L 67/42
See application file for complete search history.

(56) References Cited

U.S. PATENT DOCUMENTS 8,627,438 B1* 1/2014 Bhimanaik ............. H04L 63/10
726/9
9,466,051 B1* 10/2016 Roth ....................... G06Q 20/02
(Continued)

OTHER PUBLICATIONS

Anonymous: "Web crawler—Wikipedia, the free encyclopedia", 18 Apr. 2013, XP055305038, Retrieved from the Internet: URL:https://en.wikipedia.org/w/index.php?title=web_crawler&oldid=550954672 (13 pages).
(Continued)

*Primary Examiner* — Abdullahi E Salad
(74) *Attorney, Agent, or Firm* — Fish & Richardson P.C.

(57) ABSTRACT

A method for establishing a trust association includes receiving, by a server, a request to associate a web source with an account, the request having a link to the web source, and accessing, by the server, the web source in response to the request to associate. The method further includes locating, by the server and within the web source, a tag associated with the account, creating, by the server and in response to locating the tag within the web source, a trust association between the account and the web source, and providing, by the server, an indication of the trust association for display in a user interface of a client device.

21 Claims, 8 Drawing Sheets

(51) Int. Cl.
*H04L 12/26* (2006.01)
*G06Q 50/00* (2012.01)

(56) References Cited

U.S. PATENT DOCUMENTS

| | | | |
|---|---|---|---|
| 2007/0203849 A1 | 8/2007 | Cameron et al. | |
| 2009/0260072 A1* | 10/2009 | Rouskov | G06F 21/335 |
| | | | 726/9 |
| 2010/0010826 A1 | 1/2010 | Rosenthal et al. | |
| 2010/0306830 A1 | 12/2010 | Hardt | |
| 2011/0004504 A1 | 1/2011 | Ives et al. | |
| 2011/0138062 A1* | 6/2011 | Bansod | H04L 63/061 |
| | | | 709/227 |
| 2011/0247055 A1* | 10/2011 | Guo | H04L 63/0823 |
| | | | 726/4 |
| 2013/0018737 A1* | 1/2013 | Kumar | G06F 17/30864 |
| | | | 705/14.73 |
| 2013/0091582 A1* | 4/2013 | Chen | G06Q 10/10 |
| | | | 726/26 |
| 2013/0133054 A1 | 5/2013 | Davis et al. | |
| 2013/0133504 A1* | 5/2013 | Takegawa | G10D 13/00 |
| | | | 84/421 |
| 2013/0227700 A1* | 8/2013 | Dhillon | G06Q 50/01 |
| | | | 726/26 |
| 2014/0090033 A1* | 3/2014 | Lerner | H04L 63/10 |
| | | | 726/5 |

OTHER PUBLICATIONS

Extended European Search Report for corresponding European application EP14785242 dated Oct. 4, 2016 (8 pages).
International Search Report and Written Opinion issued in corresponding International Application No. PCT/US2014/034703 dated Aug. 18, 2014 (7 pages).

* cited by examiner

METHOD AND SYSTEM FOR ESTABLISHING A TRUST ASSOCIATION

CROSS-REFERENCE TO RELATED APPLICATIONS

Pursuant to 35 U.S.C. § 119(e), this application claims benefit of U.S. Provisional Application No. 61/814,042 filed on Apr. 19, 2013, entitled "WEB IDENTITY VERIFICATION." U.S. Provisional Application 61/814,042 is incorporated herein by reference in its entirety.

BACKGROUND

Users of the Internet can have any number of online identities, profiles, and presences. As a result, trusting a user's identity is difficult. As the Internet continues to grow, some segments of the Internet staunchly hold on to anonymity, while other segments are attempting to associate online information with one or more trustworthy identities, including real-world identities.

SUMMARY

In general, in one or more aspects, the invention relates to a method for establishing a trust association. The method comprises receiving, by a server, a request to associate a web source with an account, the request comprising a link to the web source; accessing, by the server, the web source in response to the request to associate; locating, by the server and within the web source, a tag associated with the account; creating, by the server and in response to locating the tag within the web source, a trust association between the account and the web source; and providing, by the server, an indication of the trust association for display in a user interface of a client device.

In general, in one or more aspects, the invention relates to a method for establishing a trust association. The method comprises: receiving, by a server and from a client device associated with an account, a request to associate the account with a web source; identifying, by the server and within the web source, a tag associated with the account; creating, by the server and in response to the tag, a trust association between the account and the web source; sending, by the server and to the client device, a confirmation of creating the trust association, wherein the client device displays an indication of the trust association.

In general, in one or more aspects, the invention relates to a system. The system comprises: a server, executing an application for establishing a trust association and comprising functionality to: receive a request to associate a web source with an account, the request comprising a link to the web source; access the web source in response to the request to associate; locate, within the web source, a tag associated with the user; create, in response to locating the tag within the web source, a trust association between the account and the web source in the SN; and provide an indication of the trust association for display in a user interface of a client device.

Other aspects of the invention will be apparent from the following description and the appended claims.

DETAILED DESCRIPTION

Figure 1A:
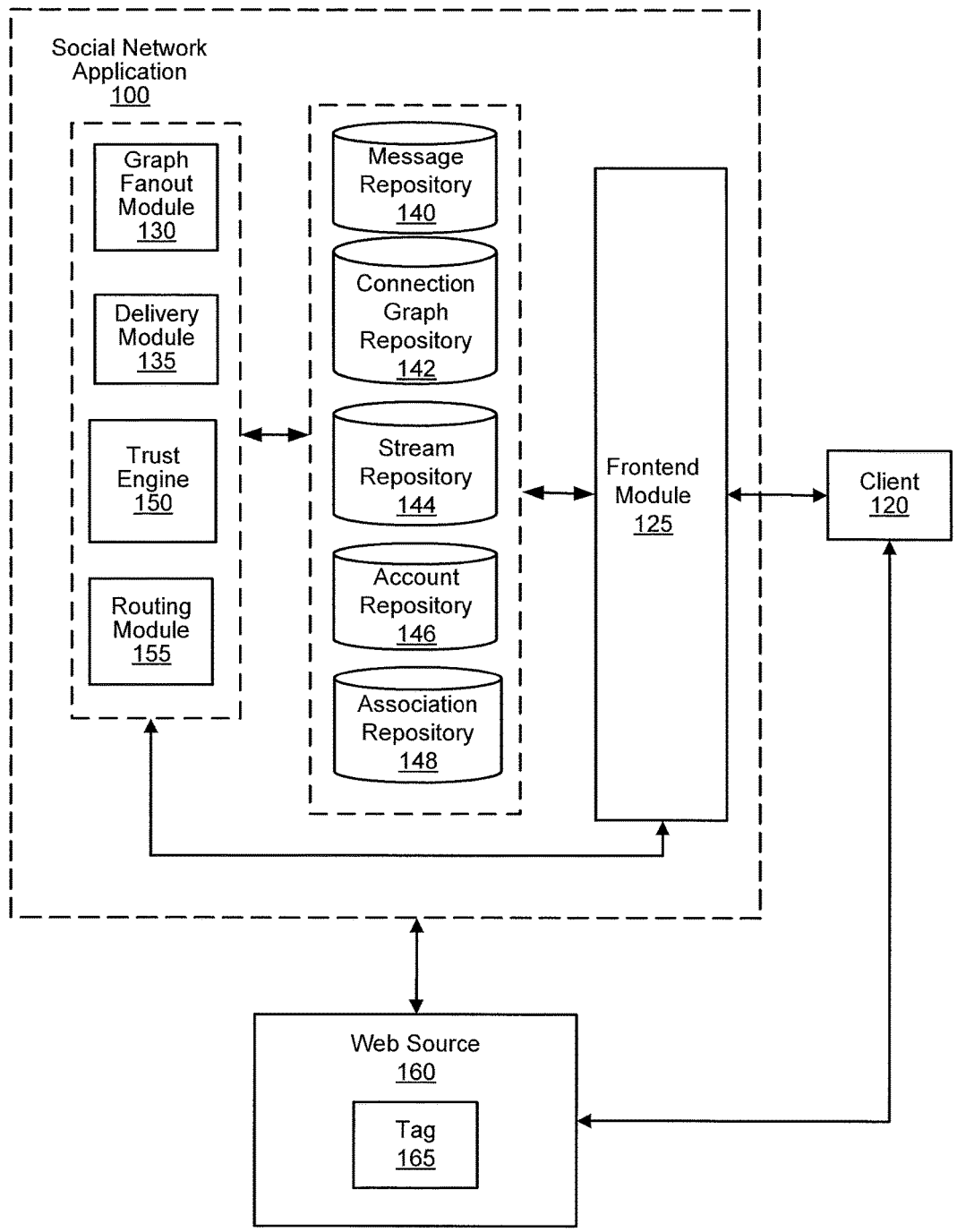
FIG. 1A shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for establishing a trust association between an account and a web source. Initially, a link to a web source is obtained from the account. The web source is accessed, and an authorization to associate the web source with the first account is identified within the web source, such as a tag. Using the authorization, an association between the account and the web source is created. Optionally, additional steps may be performed such as displaying an indication of association on the account (such as a badge, icon, etc.), gathering data about mentions of the web source, generating reports, ranking the account higher in search results (or other results) based on being a trusted account, etc.

Embodiments of the invention have many potential uses, in many different contexts. In one embodiment, the accounts are on a social network (SN), or another messaging platform. Alternatively, the accounts may be on a web site, within an application (e.g., a video game, operating system, etc.) or any other suitable location. As such, when a specific embodiment is referred to in the specification, the invention should not be limited to the specified embodiment.

For the purposes of this disclosure, a trusted account is an account that has a confirmed relationship with a specified web source, such as a website. The trusted account does not necessarily mean that the real-world identity of the user (e.g., a real person's name, address, etc.) has been confirmed. Rather, the trusted account indicates that the account has provided evidence that the owner of the account is who they claim to be. For example, if an account is a member of a band, and they provide a link to the band website (which confirms their membership in the band) the account would be trusted, and users of the SN are able to view the association and know that the account is more likely to be for the member of the band than an untrusted account. Trust association may have additional effects, such as enabling the account to view reports about the mentions of the web source on the social network, or having the account rank higher in search results based on the association and/or the knowledge of a link between the web source and the account, etc. It will be apparent to one of ordinary skill in the art, having the benefit of this disclosure, that there are many ways to trust an account and many potential effects of trust association and, as such, the invention is not limited to the above examples.

FIG. 1A shows a schematic diagram of a system in accordance with one or more embodiments of the invention. Specifically, FIG. 1 shows a social network application (100), a client (120), and a web source (160) in accordance with one or more embodiments of the invention. The social network application (100) may also be referred to as a messaging platform in accordance with one or more embodiments of the invention.

A social network application (100) connects users to other users of the social network application (100), exchanges social networking messages between connected users of the social network application (100), and provides an interface for a user to create and view social network messages (e.g., via client (120)). In one or more embodiments of the invention, social network messages are broadcast social networking messages that are transmitted to at least a set of users. The users in the set may be self-selected (e.g., followers of the transmitting user) or users that satisfy a certain status with the transmitting user (e.g., belong to a group such as friends, family, etc.). The social networking messages may include, but are not limited to, a comment from a user, a reference to a network location, personal status update, an official statement by a user representing an organization, a reference to another user of the social network, one or more terms descriptive of the message, an offer to buy or sell goods, and other information not listed above. The social networking messages may also include, but are not limited to, text, universal resource locators (URLs), pictures, media files, multimedia files, and other elements not listed above. In one or more embodiments of the invention, the social network application (100) may include restrictions on the size of messages, such as a restriction on number of characters, size of included media, and other restrictions not listed above.

As shown in FIG. 1A, the social network application (100) has multiple components including a frontend module (125), a graph fanout module (130), a delivery module (135), a message repository (140), a connection graph repository (142), a stream repository (144), an account repository (146), a association repository (148), a trust engine (150), and a routing module (155). Various components of the social network application (100) may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g., a local area network (LAN), the Internet, etc.) using any combination of wired and wireless connections using any combination of communication protocols. Those skilled in the art will appreciate that there may be more than one of each separate component running on a device, as well as any combination of these components within a given embodiment of the invention.

In one or more embodiments of the invention, the social network application (100) is a platform for facilitating real-time communication between one or more entities. For example, the social network application (100) may store millions of accounts of individuals, businesses, and/or other entities (e.g., pseudonym accounts, novelty accounts, etc.). One or more users of each account may use the social network application (100) to send social networking messages to other accounts inside and/or outside of the social network application (100). The social network application (100) may be configured to enable users to communicate in "real-time", i.e., to converse with other users with a minimal delay and to conduct a conversation with one or more other users during concurrent (which may include simultaneous) sessions. In other words, the social network application (100) may allow a user to broadcast social networking messages and may display the social networking messages to one or more other users within a reasonable time frame so as to facilitate a "live" conversation between the users. Recipients of a social networking message may have a predefined graph relationship with an account of the user broadcasting the social networking message. In one or more embodiments of the invention, the user is not an account holder or is not logged in to an account of the social network application (100). In this case, the social network application (100) may be configured to allow the user to broadcast social networking messages and/or to utilize other functionality of the social network application (100) by associating the user with a temporary account or identifier.

In one or more embodiments of the invention, social network application (100) includes functionality to track mentions of web source (160) on the SN, and to generate reports. The mentions may be tracked in, and the reports may be generated in any manner now known or later developed. Additionally, the reports may contain any amount and/or type of charts, graphs, data, etc.

In one or more embodiments of the invention, the routing module (155) includes functionality to receive one or more social networking messages and to store the social networking messages in the message repository (140). The routing module (155) may include functionality to assign an identifier to the social networking message and to store data about the social networking message. The routing module (155) may further include functionality to notify the graph fanout module (130) of a sender of the social networking message.

In one or more embodiments of the invention, the graph fanout module (130) includes functionality to retrieve graph data from the connection graph repository (142) and to use the graph data to determine which accounts in the social network application (100) should receive the social networking message. The graph data, for example, may reflect which accounts in the social network application are "following" a particular account and are, therefore, subscribed to receive status social networking messages from the particular account.

In one or more embodiments of the invention, the delivery module (135) includes functionality to receive a list of accounts from the graph fanout module (130) and the message identifier generated by the routing module (155) and to insert the message identifier into stream data associated with each identified account. The delivery module (135) may then store the message list in the stream repository (144). The data stored in the stream repository (144) ("stream data") may make up one or more streams associated with one or more accounts of the social network application (100). A stream may be a dynamic list of social networking messages associated with one or more accounts or may reflect any arbitrary organization of social networking messages that is advantageous for the user of an account.

In one or more embodiments of the invention, the frontend module (125) is a software application or a set of related software applications configured to communicate with external entities (i.e., client (120), web source (160), etc.). The frontend module (125) may include the application programming interface (API) and/or any number of other components used for communicating with entities outside of the social network application (100). The API may include any number of specifications for making requests from and/or providing data to the social network application (100).

In one or more embodiments of the invention, the frontend module (125) is configured to use one or more of the data repositories (e.g., message repository (140), connection graph repository (142), stream repository (144), account repository (146), and/or association repository (148)) to define streams for serving social networking messages (i.e., stream data) to a user of the account on the social network application (100). A user may use any client (120) to receive the social networking messages. The client (120) may be any computing system (as defined below in FIG. 5). For example, where the user uses a web-based client to access the social network application (100), an API of the frontend module (125) may be utilized to define one or more streams and/or to serve the stream data to the client for presentation to the user. Similarly, different forms of message delivery may be handled by different modules in the frontend module (125). In one or more embodiments of the invention, the user may specify particular receipt preferences, which are implemented by the frontend module (125).

In one or more embodiments of the invention, one or more of the data repositories (e.g., message repository (140), connection graph repository (142), stream repository (144), account repository (146), and/or association repository (148)) is a database and/or storage service residing on one or more servers. For example, one or more of the data repositories may be implemented as a storage service using service-oriented architecture (SOA) and configured to receive requests for data and to provide requested data to other components of the social network application (100). In another example, the message repository (140) may include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application may be used, in accordance with various embodiments of the invention.

In one or more embodiments of the invention, one or more of the data repositories (e.g., message repository (140), connection graph repository (142), stream repository (144), account repository (146), and/or association repository (148)) is a separate application or set of applications residing on one or more servers external (and communicatively coupled) to the social network application (100). Alternatively, in one or more embodiments of the invention, one or more of the data repositories may be an integrated component of the social network application (100) and/or may reside, either partially or entirely, on one or more common hardware devices (e.g., a server).

In one or more embodiments of the invention, the association repository (148) may store data relating to the associations of accounts on the SN. For example, association repository (148) may store information about web sources used to associate accounts, which accounts are trusted, trusted account membership data (such as the drummer of a band, a reporter for a news organization, etc.), and/or any other data related to trust association of accounts.

In one or more embodiments of the invention, the message repository (140) includes functionality to store message data items that include social networking messages and social networking messages metadata. The social networking messages metadata may include, but is not limited to, an identifier of the originating user of the social networking message, a list of users who received the social networking message, a number of users who received the social networking message, statistics (e.g., a ratio of connected users to the originating user that forward the social networking message versus disconnected users to the originating user that forward the social networking message), time and date in which the social networking message is transmitted, and other information. The message repository may also include functionality to store engagement data items.

In one or more embodiments of the invention, the connection graph repository (142) stores information about users' connections. Specifically, the connection graph repository may relate user identifiers of a user to other users' identifiers, user's preferences, and history in the social network application (100). For example, the user preferences and history may include language, connections of the user, topics in which the user is interested and other information.

In one or more embodiments of the invention, the account repository (146) stores information about users' accounts. Specifically, the account repository (146) may store account data items that include information about a location of a user, a self-description of the user, interests of the user, whether the account is a verified account, etc.

In one or more embodiments of the invention, the web source (160) is any identifiable location on the Internet. For example, the web source (160) may take the form of a commercial website, personal website, a blog, social networking profile/website, business profile, etc. In one embodiment of the invention, the web source (160) is a collection of source code and, optionally, other content (e.g., audio files, media files, image files, text files, etc.). The source code of the web source (also referred to as "web source code") may be executed, interpreted or otherwise processed by a web browser (executing on a client) in order generate a web page that may be displayed to the user via the web browser. Web source (160) is accessible to the user via one or more clients (120). A user, in any manner now known or later developed, is able to exercise control over web source (160) so that tag (165) may be inserted into web source (160), where such a user may be acting on their own account, on an account associated with another user and/or on an account associated with a legal entity. There are many relationships that the user may have with regards to web source (160), including, but not limited to: owner or co-owner, administrator, member of (such as professional members, band memberships, etc.), employee of (such as a reporter for a news website, etc.), and or any other relationship.

In one or more embodiments of the invention, the tag (165) is an indication that an account on the SN is associated with web source (160) and/or an authorization to associate the account on the SN with the web source (160). Tag (165) may include the name of the account on the SN with which is associated. For example, the tag may say "my account name on SN is 123abc." Tag (165) may include other information, such as an option to friend or follow the account on the SN, recent messages from the account, related accounts/memberships, and/or any other data. Tag (165) may take any form now known or later developed. For example, tag (165) may be a rel-tag in the HyperText Markup Language (HTML) of web source (160). As another example, tag (165) may be an hCard, which is a format that allows vCards to be embedded within an HTML page. Tag (165) may be invisible to a viewer/user of web source (160). Alternatively, tag (165) may be visible to a viewer/user of web source (160).

In one or more embodiments of the invention, tag (165) may be created by and/or provided by the SN, such as through a software development kit (SDK), application programming interface (API), or any other suitable method. Alternatively, tag (165) may be custom made by a user. In one or more embodiments of the invention, tag (165) may contain membership information (e.g., drummer in a band, etc.), may identify associated accounts (e.g., identify the official account for the band, identify the official account for the record label of the band, etc.), and/or may contain any other data relevant and/or useful to identification. It will be apparent to one of ordinary skill in the art, having the benefit of this disclosure, that tag (165) may be implemented in many different ways, in any language or format, and may contain a variety of data and, as such, the invention is not limited to the above examples.

In one or more embodiments of the invention, there may be multiple tags within a single web source. For example, if the web source is the website of a band, a tag may be present for each member of the band. When one (or more) members of the band request a trust association be created between their account and the band website, the SN may detect the additional tags present within the website, and present the option of creating an association to those additional accounts. Alternatively, a one-way trust association may be created. In other words, rather than the account identifying a web source and the web source identifying an account (i.e., via a two-way association), a one-way trust association occurs when a web-source identifies an account, but the account does not identify the web source. This one-way trust association may be used in a similar manner to a trust association: the account (and content originating from the account) may be promoted more so than an untrusted account. However, this promotion may be to a lesser degree than if a two-way association were present. Alternatively, the promotion may be the same as if a two-way association were present.

Figure 1B:
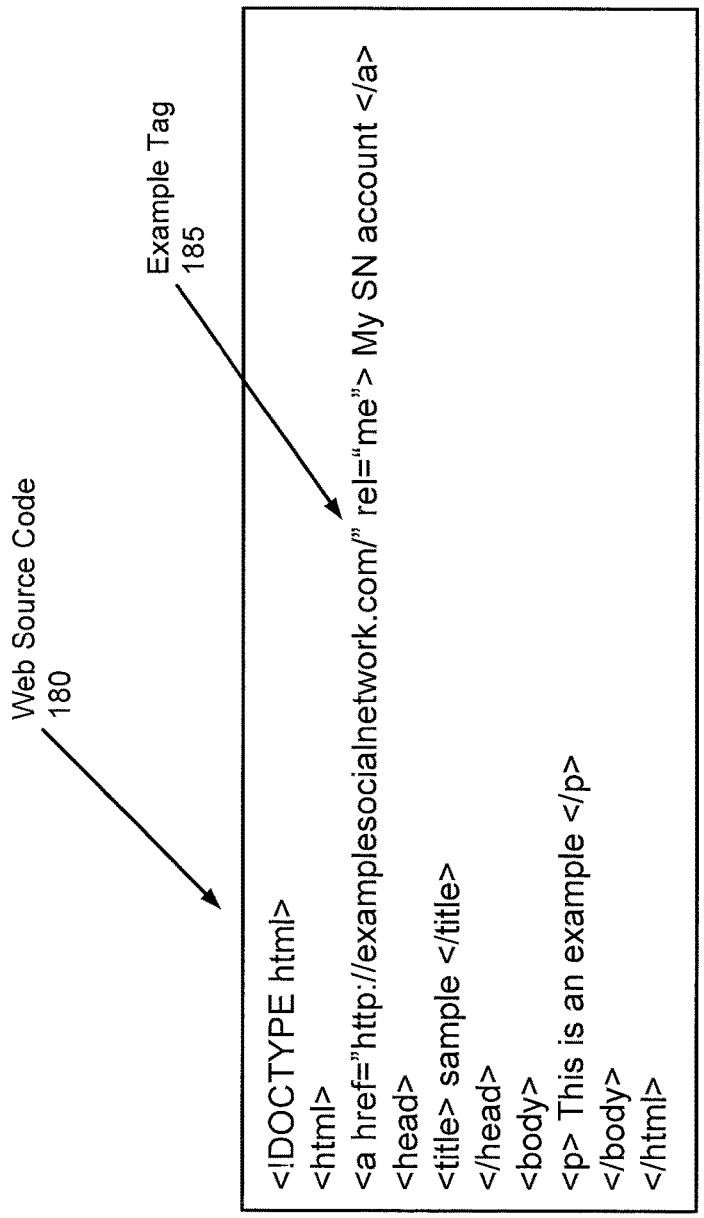
FIG. 1B shows an example web source code in accordance with one or more embodiments of the invention.

Turning briefly to FIG. 1B, a web source code (180) is shown for a web source (i.e., web source (160)), including an example tag (185). Specifically, web source code (180) is pseudo code for a portion of a web source, in HTML format. Within web source code (180) is example tag (185) stating: <a href=http://examplesocialnetwork.com/mySNaccount/" rel="me"> My SN account </a>. In this instance, example tag (185) would provide a hyperlink clickable by a visitor to the web page created by web source code (180), and the hyperlink would direct the visitor to an account on the SN—"mySNaccount." The presence of this tag in the source code of a web page may then be used to create a trust association with "mySNaccount." It will be apparent to one of ordinary skill in the art, having the benefit of this disclosure, that there are many ways to implement a tag and, as such, the invention is not limited to the above example.

Returning to FIG. 1A, In one or more embodiments of the invention, the trust engine (150) includes functionality for accessing a web source, locating and/or identifying a tag within the web source, creating a trust association with a web source(s) and an account on the SN, sending confirmations, determining memberships, and/or any other functionality needed to implement one or more embodiments of the invention. Trust engine (150) may access a web source in any manner now known or later developed. In one or more embodiments, a web bot, such as a web crawler, may be used to access a web source. Alternatively, any other method may be used to access a web source. Once the web source is accessed, the trust engine (150) includes functionality to locate and/or identify whether any tags associated with the SN are present within the web source. The tags may be identified and/or located using any manner now known or later developed. For example, if a bot or other similar solution is used, the bot may analyze the code of the website to search for the tag. As another example, if the tag is visually represented on the web source, then screen scraping may be used to locate and/or identify the tag. It will be apparent to one of ordinary skill in the art, having the benefit of this disclosure, that the tag may be located and/or identified in many ways and, as such, the invention should not be limited to the above examples.

In one or more embodiments, the trust engine (150) may create an association between a web source and an account on the SN by confirming that the account that provided the link to the web source is the same account identified by the tag on the web source. Once an association between the account and the web source is confirmed, the trust engine (150) may modify the account's data on the SN and indicate that the account is trusted, may give the account the ability to display a trusted graphical element, such as a badge, or other indication of trust to other users of the SN, and/or any other special abilities or privileges. In one or more embodiments of the invention, the trust graphical element may be displayed on any suitable part of the user interface (UI), and may indicate a strength, or weight, of verification. For example, an authoritative web source on a subject matter and/or a popular website may lend more strength to the association than a web source that was created yesterday, lacks content, and/or is not popular. Likewise, when multiple different web sources are associated with an account the result may be reflected as a stronger level of trust (i.e., there is a greater likelihood that the individual is who he or she says they are). For example, if an account is associated with two web sources, that account may receive a stronger (or higher) trust level than an account associated with only one web source. The strength of the trust may be displayed using color coding, numbers, different images, and/or any other suitable method. Similarly, memberships (discussed below) may be displayed in any of the above ways, or in any other manner now known or later developed. If shown, the membership information may directly indicate who the account is related to (i.e., the band, the web source, another SN account, etc.).

In one or more embodiments of the invention, the trust engine (150) may include functionality for determining memberships and/or related accounts. When trust engine (150) locates additional social networking accounts tagged within a single web source, the trust engine (150) may also allow the account(s) the option of associating themselves using the web source if they were not the account requesting association. Additionally, the trust engine (150) includes functionality for identifying memberships, and may allow accounts the option to display that they are a member of an organization or entity (e.g., member of a band, reporter for a newspaper, associate at a law firm, etc.) upon association if the membership data was located in the tag on the web source provided by the account.

In one or more embodiments of the invention, upon association, the trust engine (150) may send a notification to the account informing the user(s) of the account of the results, whether or not the association was successful. Once trusted, the user of the trusted account (or a user that has access to the trusted account when the account is associated with a legal entity, such as a corporation) may have access to reports generated about the mentions of the web source on the SN. The reports may include any gathered or processed data, and may be formatted and/or presented in any manner now known or later developed.

In one or more embodiments of the invention, the trust engine (150) includes functionality for promoting trusted accounts, content generated from trusted accounts, and/or any other actions related to a trusted account. For example, the trusted account may be promoted (in comparison to untrusted accounts, etc.) in a who to follow service, which provides suggested accounts for a user to follow. Similarly, content generated from trusted accounts may be promoted and displayed more often to users, and may receive higher rankings in searches. Further, trusted accounts may be more often used to deduce interests of users viewing the trusted accounts. These interests, in addition to the other data discussed herein, may be used to serve ads to the user(s) viewing the trusted accounts.

In one or more embodiments of the invention, the trust engine (150) includes functionality for creating a one-way trust association. A one-way trust association occurs when a web-source identifies an account, but the account does not identify the web source. This one-way trust association may be used by trust engine (150) in a similar manner to a trust association: the account (and content originating from the account) may be promoted more so than an untrusted account. However, this promotion may be to a lesser degree than if a two-way association were present. Alternatively, the promotion may be the same as if a two-way association were present.

The trust engine (150) can be configured to store a one-way association is the association repository (148) for use in content recommendation, though it may not be displayed to users of the SN. For example, the trust engine (150) can be configured to identify accounts having common interests and/or relevance to a context account. In this example, if a web source identifying multiple accounts is deemed to be relevant to the context account, all accounts having associations with the web source can be positively weighted for inclusion in a set of recommended accounts. Those accounts having two-way associations can be weighted more heavily than accounts having one-way associations by a predefined amount (e.g., 50%). In another example, a client may send a request for recommended messages to the SN. In this example, the web source, associations, and related accounts can be identified as in the prior example. After identifying the related accounts, the trust engine (150) can be configured to identify and rank relevant messages from the related accounts. In this example, messages from accounts having a two-way association with the web source are weighted more heavily than messages having a one-way association with the web source. Thus, in one or more embodiments of the invention, the trust engine (150) can be configured to use trust associations to identify relevant accounts, relevant messages (messages promoted as advertisements), and/or any type of associated content (e.g., images, video, text, advertisements) for promotion to one or more accounts of the SN.

Figure 2A:
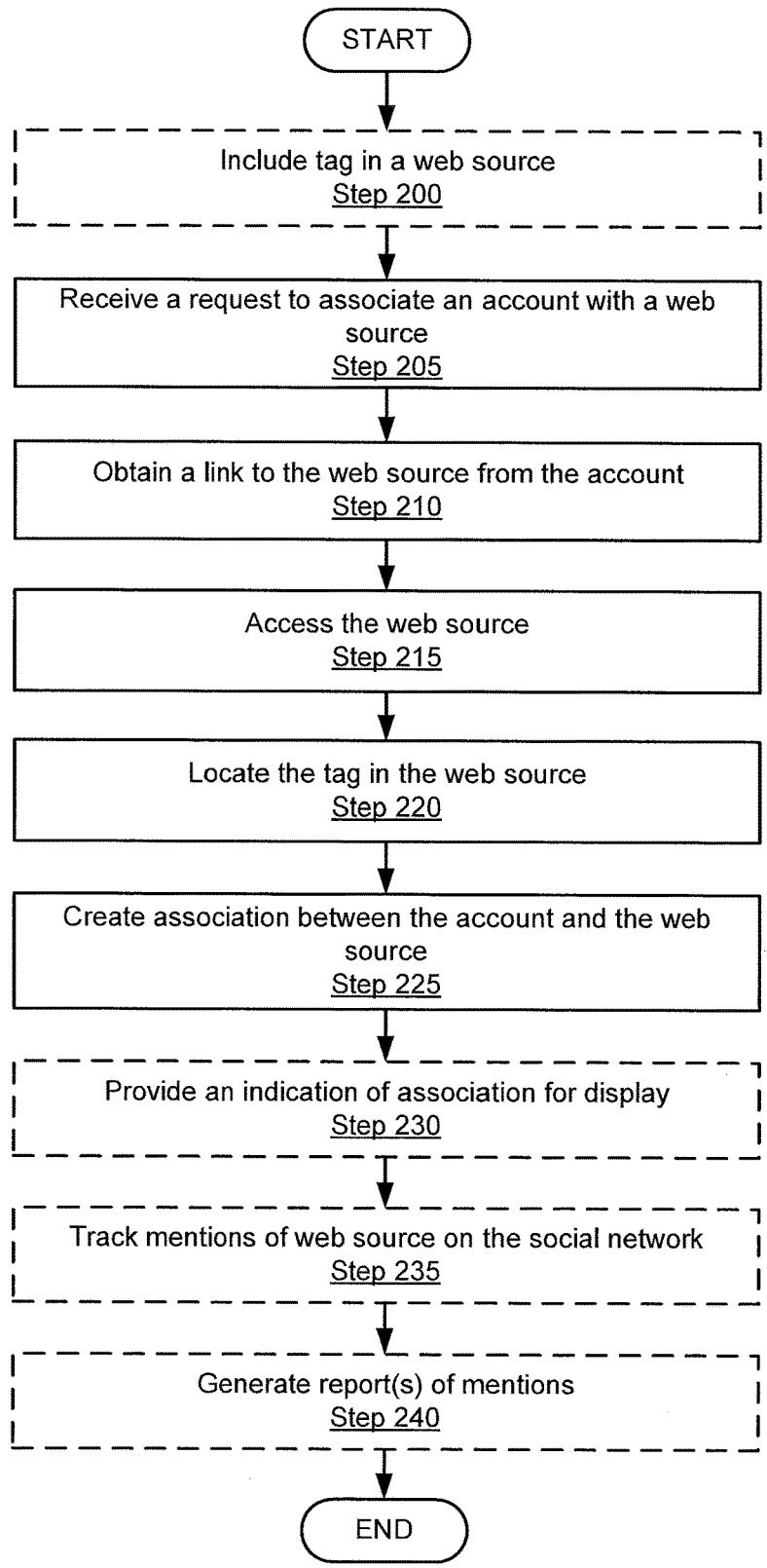
FIGS. 2A and 2B show flowcharts of a method in accordance with one or more embodiments of the invention.

In one or more embodiments of the invention, the trust engine (150) is configured to perform the methods described in FIGS. 2A and/or 2B.

The invention is not limited to the system shown in FIG. 1A. Further, though not shown in FIG. 1A, any component in FIG. 1A may be connected to any other component shown in FIG. 1A without departing from the invention.

FIG. 2A shows a flowchart of a method for establishing trust associations between an account and a web source. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2A should not be construed as limiting the scope of the invention.

In Step 200, a tag is included in a web source. The tag may be of any format, such as an HTML tag, vCard, hCard, hyperlink, etc. The tag is typically included in the web source by the user of an account on the SN, on behalf of the user of the account on the SN, or on behalf of a legal entity (e.g., a company, a corporation, a partnership, or any other type legal entity) that controls the account on the SN. The tag indicates that the user (or legal entity) of the account has access to or control over web source, and is an authorization for use in establishing a trust association between the account and the web source. As indicated by the dotted line, Step 200 is performed outside of the SN.

In Step 205, a request to associate an account with a web source is received. The request may be received in any manner now known or later developed, and may be received from any suitable source, such as a user of the account, a user of the SN viewing the account, a user acting on behalf of a legal entity that controls the account, etc. In one or more embodiments of the invention, the request may optionally include a link to the web source and/or any other suitable data.

In Step 210, a link is obtained to a web source from the account. The link may correspond to a universal resource locator (URL), a universal resource indicator (URI) or any other information in any form that may be used to locate the web source. The link may be obtained, for example, from the profile of the account on the SN. Alternatively, the link may be obtained from the request, or any other suitable location. In one or more embodiments of the invention, the link is viewable to other users of the SN. Optionally, in one or more embodiments of the invention, multiple links may be obtained in Step 210, allowing the account to be associated using multiple web sources, and resulting in a stronger or higher level of trust. In this embodiment, Steps 215, 220, and 225 may be performed as many times as necessary.

In Step 215, the web source is accessed using the link. More specifically, the link may be used to locate the web source. Once located, the web source may be accessed in any manner now known or later developed, such as by web bots, such as crawlers, or any other suitable method.

In Step 220, the tag is located in the web source. The tag may be located by analyzing the code of the web source, performing screen scraping, or by any other suitable method now known or later developed. The tag may be located in any suitable portion or part of the web source.

In Step 225, an association between the account and the web source is created. The account may be created after comparing an account name, handle, or other identifier associated with the tag to the account name, handle, or other identifier associated with the account on the SN. When there is a match (based on the above comparison), an account is trusted. When there is no match, (based on the above comparison), an account may be denied association. The association may be created and/or stored in any manner now known or later developed.

Optionally, in Step 225, other SN accounts or aspects may also be confirmed, such as memberships. For example, if the tag includes information identifying that the account is a member of an entity, organization, etc., the membership may be confirmed by checking with a trusted account associated with the entity, organization, etc. (such as the official account for the organization, etc.). Additionally, in Step 225 other accounts that are identified within the web source (e.g., a second tag, etc.) may also have associations created in any manner now known or later developed.

In Step 230, an indication of association is provided for display. The indication of association may take any suitable form, such as a badge, icon, text, picture, sound effect, etc. The indication of association may be viewable by all users of the SN, only by friends, followers, and/or subscribers to the trusted account, or by any other suitable grouping of users of the SN. The badge (or other suitable element, etc.) may be color coded, change shape(s), change type(s), display numbers, and/or use any other manner to indicate the strength or level of trust. That is, if an account is associated with a particularly good (i.e., authoritative, popular, etc) web source, and/or multiple web sources, the level of trust is stronger than if, for example, the account used only a single, unpopular web source. As indicated by the dotted line, Step 230 is optional, and may or may not be performed.

In Step 235, mentions of the web source are tracked on the social network. As indicated by the dotted line, Step 235 is optional and may or may not be performed. Mentions of the web source on the SN may be tracked in any manner now known or later developed. The mentions may be tracked as a reward or bonus for verifying an account on the SN. The mentions may be direct or indirect mentions.

In Step 240, reports of the mentions are generated. The reports may include any gathered and/or processed data including, but not limited to: number of mentions, type of mentions, marketing data about the accounts mentioning the web source, etc. Further, the reports may include charts, graphs, and/or other representations. These reports may then be provided to the user of the account or to a user that is operating the account on behalf of a legal entity.

Figure 2B:
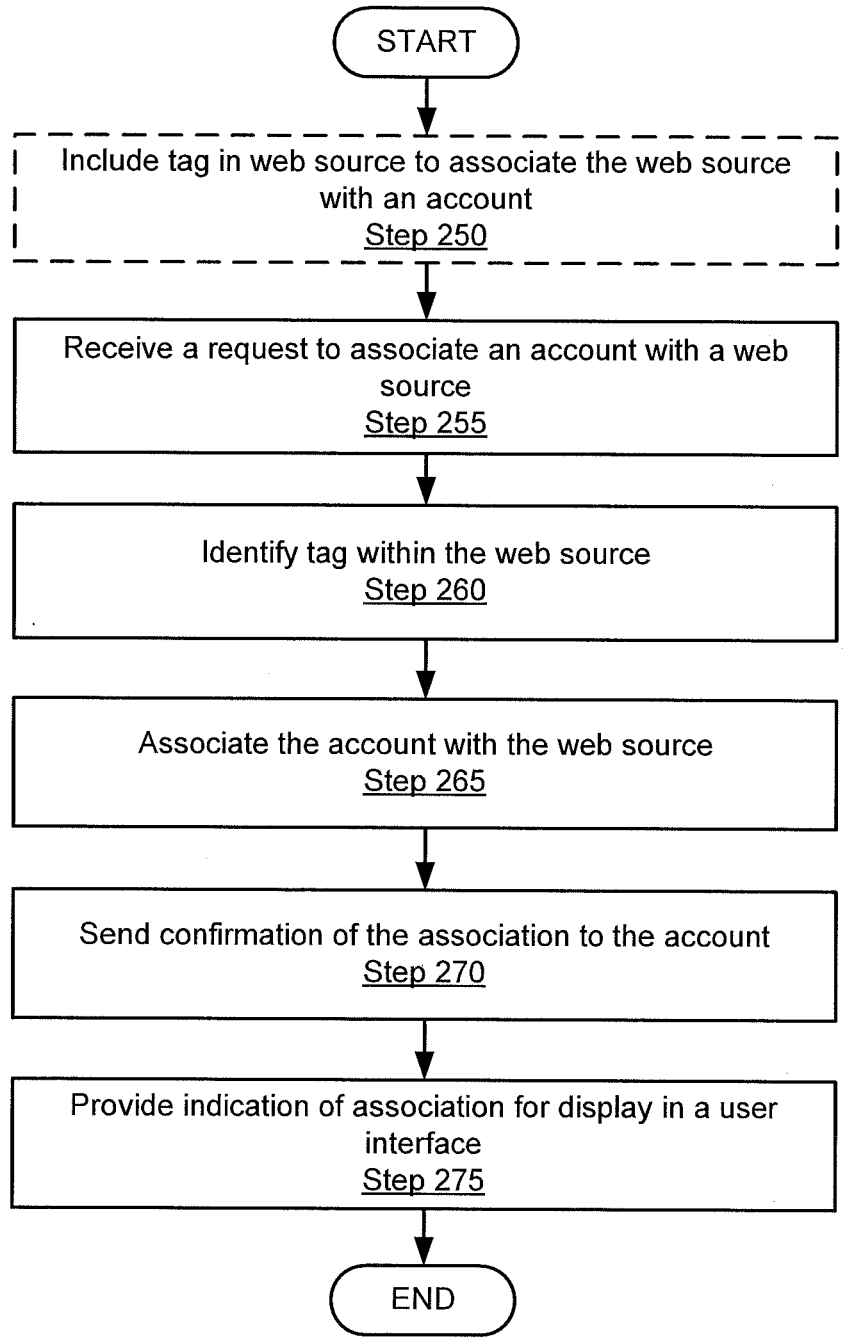

FIG. 2B shows a flowchart of a method for establishing a trust association between an account and a web source. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2B should not be construed as limiting the scope of the invention.

In Step 250, a tag to associate an account with a web source is included in the web source. In one or more embodiments of the invention, Step 250 may proceed similarly to Step 200. As indicated by the dotted line, Step 250 is performed outside of the SN.

In Step 255, a request is received to associate an account with a web source. The request may be received as discussed with regards to Step 205, above.

In Step 260, the tag is identified within the web source. The tag may be identified in any manner now known or later developed, and may be identified as discussed with regards to Step 220, above.

In Step 265, the account is associated with the web source. The association may be created in any manner now known or later developed, such as that discussed in Step 225, above.

In Step 270, a confirmation of the association is sent to the account. The confirmation may be sent in any manner now known or later developed. The confirmation may be displayed to the user of the account. Alternatively, the confirmation may be displayed to any user of the SN.

In Step 275, an indication of association for display on in a user interface is provided. The indication may be provided in any suitable manner, such as those discussed in Step 230, above. As in FIG. 2A, additional optional steps may be performed after Step 275, but are not shown in FIG. 2B.

The following section describes various examples of the invention. The examples are included to aid in the understanding of the invention and are not intended to limit the scope of the invention.

Figure 3:
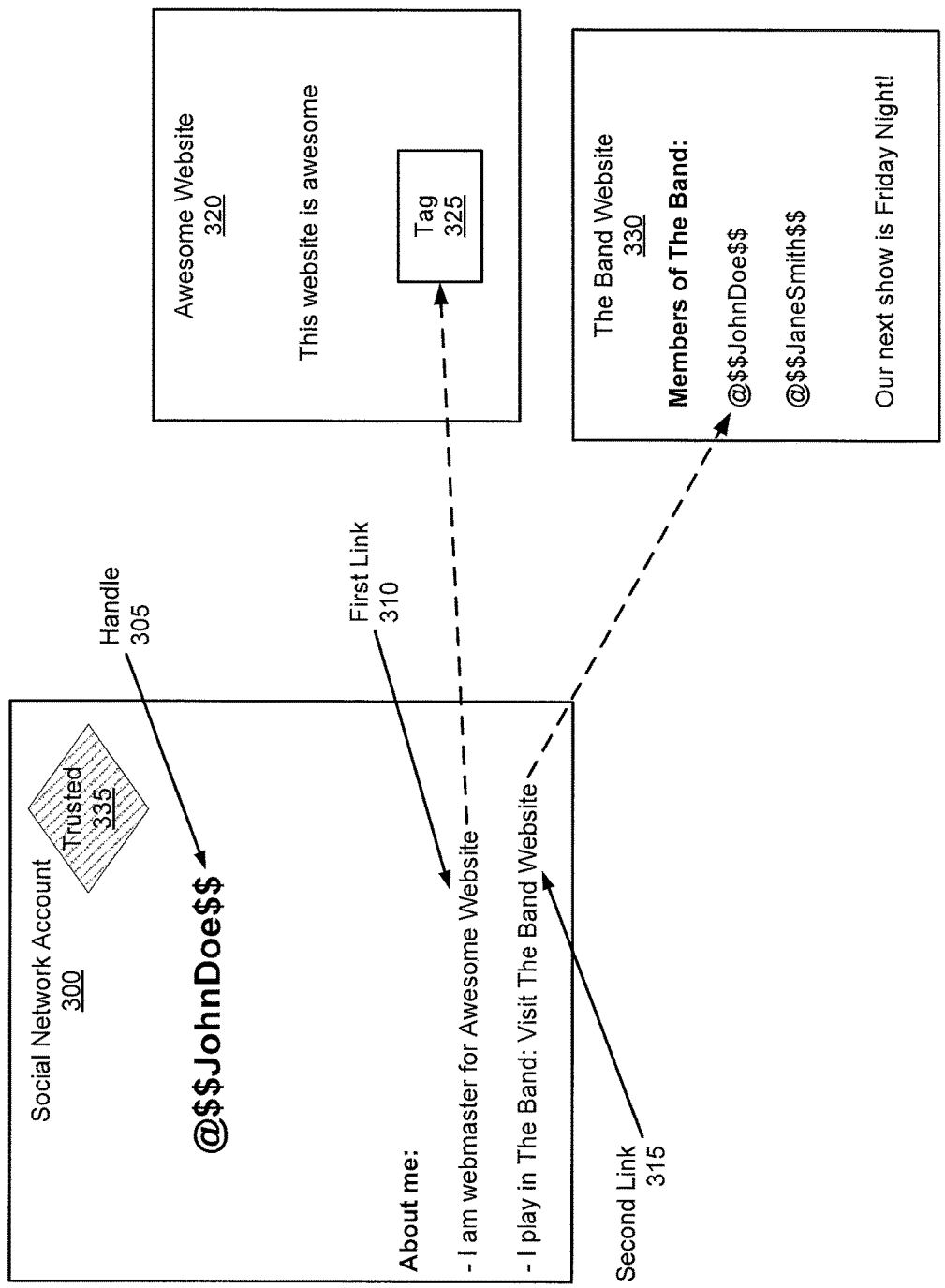
FIG. 3 shows an example in accordance with one or more embodiments of the invention.

FIG. 3 shows social network account (300) and two web sources: awesome website (320) and the band website (330). Social network account (300) includes a handle (305), which indicates that the social network account (300) is called @$$JohnDoe$$. Social network account (300) also includes a first link (310) to "Awesome Website" (320) and a second link (315) to "The Band Website" (330). The links are displayed in an "about me" portion of social network account (300). When the user of social network account (300) requests to be associated with awesome website (320) and the band website (330) using the links in the "about me" section, the social network may access "Awesome Website" (320) and "The Band Website" (330) and look for indications of authorization to associate the websites with social network account (300). At "Awesome Website" (320), tag (325) is found. Tag (325) is not visible to users/visitors of "Awesome Website" (320); rather, tag (325) is part of the source code associated with the web source, where the tag in the source code is not visible when viewing the web pages that make up the "Awesome Website". Tag (325) identifies the handle (305) as the account associated with awesome website (320), and thus @$$JohnDoe$$ is able to be associated with awesome website (320). The association causes a badge (trusted (335)) to be displayed on social network account (300).

However, the level of trust may be made stronger by linking to additional web sources and/or better web sources. Thus, @$$JohnDoe$$ has provided second link (315) as well, which the SN is also able to access. "The Band Website" (330) links to the handles of band members, and may be used by the SN to create an association. In addition to finding "@$$JohnDoe$$" in the source code for the "The Band Website", "The Band Website" (330) also lists an account of a second member of the band, @$$JaneSmith$$. The SN may use this as an indication that @$$JaneSmith$$ is a member of the band, and may present @$$JaneSmith$$ with an option to associate her account with the band website (330) if she so desires. Additionally, the SN can identify (using trust engine 150 of FIG. 1A, discussed above) a one-way association between the band website (330) and @$$JaneSMith$$. This one-way association may be used all of the same ways as a two-way association, discussed below, although the one-way association may provide a lesser, or dulled, effect compared to a "normal" two-way association. Alternatively, in one embodiment, the SN does not display indications of one-way trust associations to users of the SN. Instead, one-way associations are used to identify content (e.g., accounts, messages, etc.) for promotion, search, discovery, and other backend purposes.

Additionally, the SN may display additional data beyond just the trusted (335) badge, such as noting that @$$JohnDoe$$ is a "member of" the band, or any other memberships, indications, etc. Further, trusted (335) badge is color coded in this example, indicating that the level of trust of the account "@$$JohnDoe$$" is strong(er). In particular, "The Band Website" (330) is a very popular website, leading to a high level of trust for the "@$$JohnDoe$$" account, in addition to two web sources being used—also leading to a strong(er) level of trust. A badge may use any manner to distinguish or indicate the strength and/or levels of trust.

Additionally, although not shown in FIG. 3, once the SN determines that both "@$$JohnDoe$$" and "@$$JaneSmith$$" are both members of the band, a connection graph may be created. This connection graph allows the SN to track relationships that may not otherwise be identified within the SN. In this example, the SN knows that "@$$JohnDoe$$" and "@$$JaneSmith$$" know each other (and are probably friends) due to both being in the same band.

Once the @$$JohnDoe$$ account is trusted, many actions may be taken by the SN using this information. For example, the account may be promoted in searches, content generated by the account may be promoted and/or displayed more frequently, the account may appear more frequently as a suggested account to follow, and/or many other actions. It will be apparent to one of ordinary skill in the art, having the benefit of this disclosure, that a trusted account may receive many benefits and many actions may be taken using the knowledge that a given account is trusted and, as such, the invention should not be limited to the above examples.

Figure 4A:
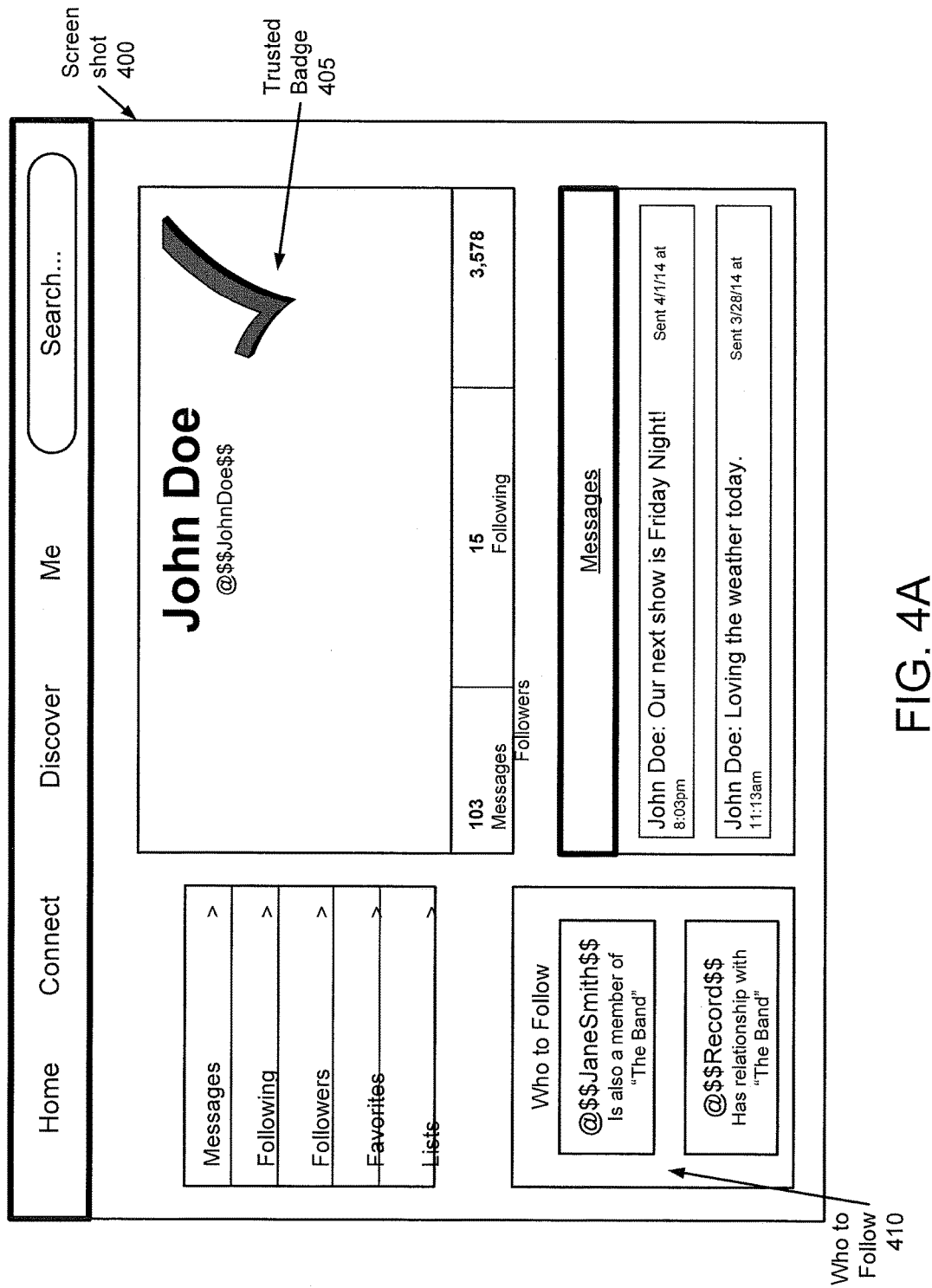
FIGS. 4A and 4B show an example in accordance with one or more embodiments of the invention.
Figure 4B:
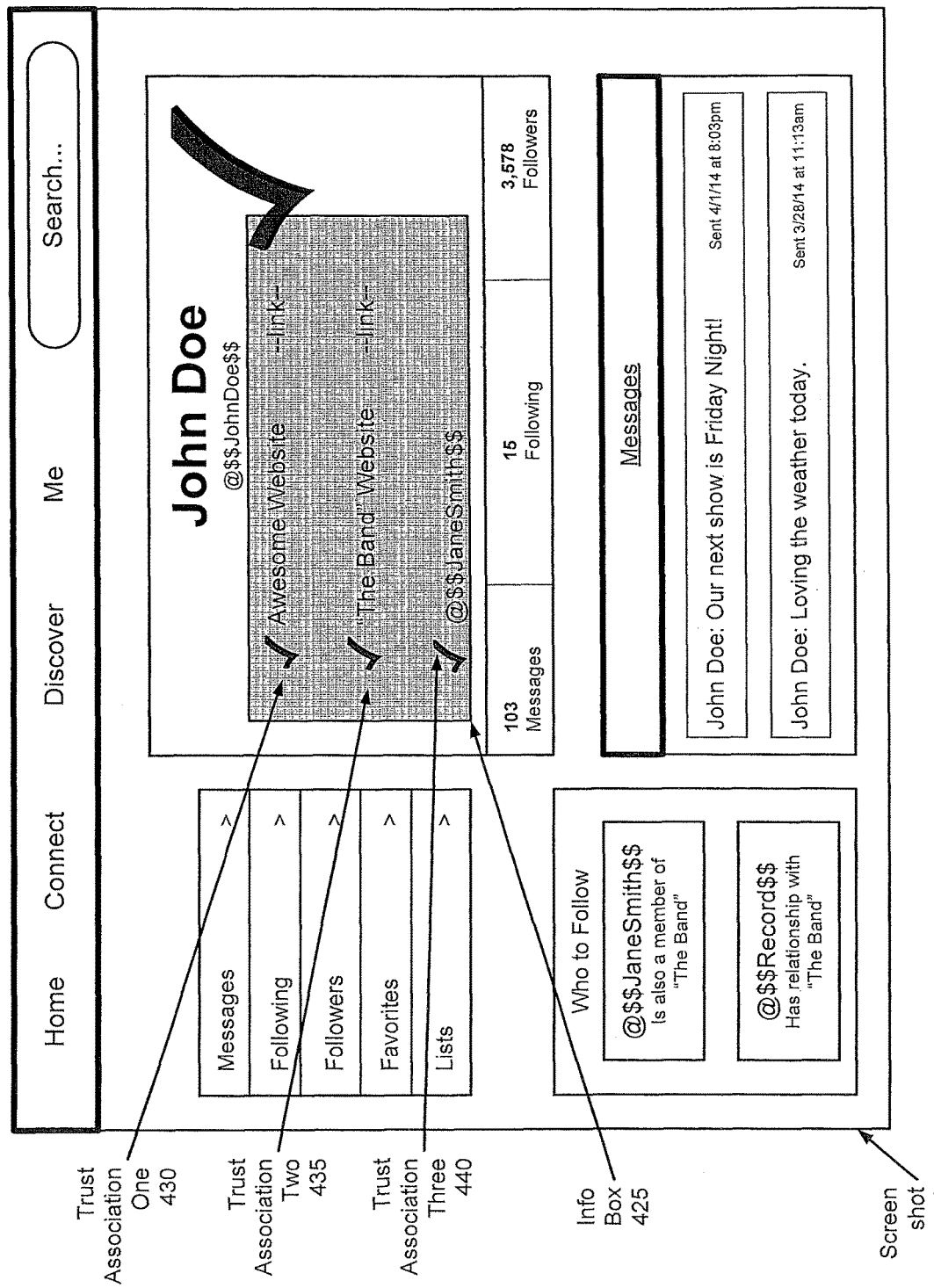

FIGS. 4A and 4B show a second example in accordance with one or more embodiments of the invention. Specifically, FIGS. 4A and 4B show a user interface (UI) that may be seen by a user of a social network viewing the account discussed in FIG. 3 (e.g., @$$JohnDoe$$). FIG. 4A shows screenshot (400), which includes trusted badge (405). Trusted badge (405) indicates that the @$$JohnDoe$$ account has been associated with one or more web sources, thereby giving the account a higher likelihood of being who they say they are (as it offers users alternative means to confirm an identity of the account). Of interest is who to follow (410) which provides suggestions to users of who they should follow within the SN. These particular users (e.g., @$$JaneSmith$$ and @$$Record$$) have been chosen because they are associated with @$$JohnDoe$$. As discussed in FIG. 3, @$$JaneSmith$$ is also a member of "The Band" and has a trust association created between her account and the "The Band" website. Thus, because the user in FIG. 4A is viewing John Doe's profile, @$$JaneSmith$$ is a suggested account to follow because of her relationship with John Doe. Similarly, @$$Record$$ is the record company of "The Band" and may also be of interest to the user. Although not shown in this example, the record company was associated with the @$$JohnDoe$$ account via @$$JaneSmith$$.

In FIG. 4B, screenshot (420) is shown. Specifically, in FIG. 4B, the user has hovered over, clicked on, or otherwise selected the trusted badge (405) of FIG. 4A, causing info box (425) to appear. Info box (425) displays the web sources and other accounts used by John Doe in acquiring the trust badge. Specifically, trust association one (430) is the web source "Awesome Website" from FIG. 3. A link to "Awesome Website" is provided; enabling the user to visit "Awesome Website" and use the information there to aid in the user's determination of whether John Doe is who he says he is. A small trust badge appears next to the "Awesome Website" link, indicating that there is a confirmed association between John Doe and "Awesome Website" (i.e., a tag was found in "Awesome Website," etc.) Although not shown in this example, a web source may be listed in an info box that does not have a confirmed association, which would result in the trust badge not being shown.

Similarly, trust association two (435) is a web source from FIG. 3—"The Band Website." A link to the web source is provided, and a small trust badge is displayed again indicating that a confirmed association exists between John Doe and "The Band Website." Trust association three (440) is another account on the SN, @$$JaneSmith$$. Jane Smith is, of course, also a member of "The Band." A small trust badge is displayed next to @$$JaneSmith$$ indicating that there is a confirmed association between the two accounts. In this instance, the confirmed relationship may be from the same web source (e.g., The Band Website, the record label website, etc.), different web sources, direct actions between the two accounts, and/or any suitable source.

Although not shown in FIG. 4B, in the event that info box (425) is unable to display all of the associations in a single view, a subset of the associations may be displayed. The subset may be selected based on many different factors including, but not limited to: number of visits to the web source, number of followers/friends of an account, popularity, distance between accounts in the connection graph, relevance to the account whose profile is being viewed, trust level of the related account or web source, etc. Alternatively, or in addition to the above, info box (425) may be able to expand, scroll, or otherwise accommodate displaying as many associations as an account may have.

Figure 5:
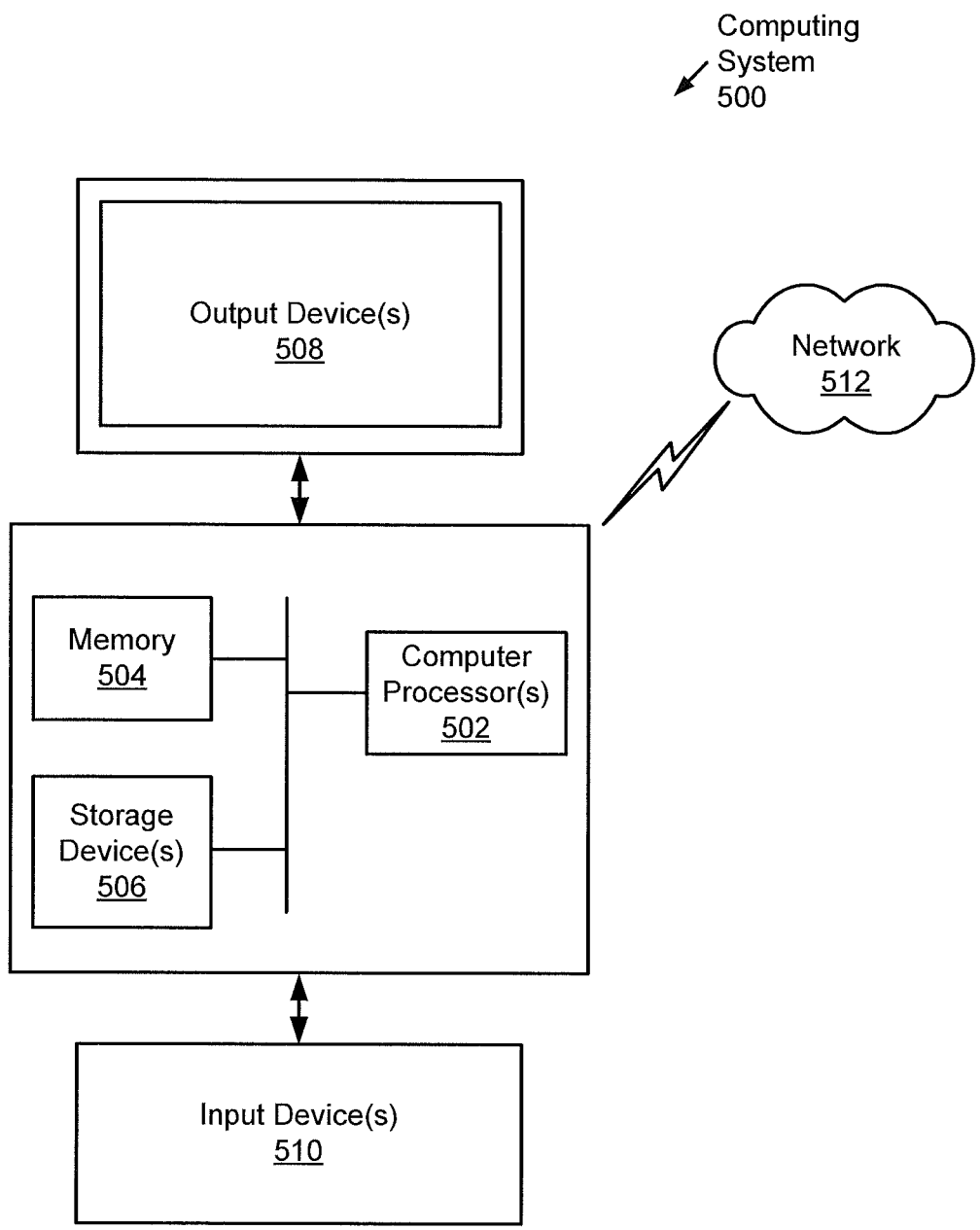
FIG. 5 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for establishing a trust association, comprising:
    receiving, by a server, a request to verify an association between a web source and a first account, the request comprising a first link to the web source and an identifier associated with the first account;
    accessing, by the server, the web source in response to the request to verify the association;
    locating, by the server and within the web source, a first authorization tag to associate the web source with the first account;
    creating, by the server and in response to a match between an identifier associated with the first authorization tag within the web source and the identifier associated with the first account, a first trust association between the first account and the web source to verify the association between the web source and the first account; and
    providing, by the server, an indication of the first trust association for display in a user interface of a client device.

2. The method of claim 1, and wherein the first authorization tag identifies a first relationship between the first account and a second account.

3. The method of claim 2, further comprising:
    identifying, using the first authorization tag, the first relationship between the first account and the second account;
    confirming, using second account, the first relationship; and
    creating a second trust association between the first account and the second account.

4. The method of claim 1, further comprising:
    locating, within the web source, a second authorization tag associated with a third account; sending, to the third account, a verification of association request;
    receiving, from the third account, a confirmation to the verification of association request; and creating a third trust association between the third account and the web source and
    a second relationship between the third account and the first account.

5. The method of claim 4, further comprising:
    creating a connection graph based on the second relationship.

6. The method of claim 1, wherein the indication of the first trust association comprises an element for a trust level.

7. The method of claim 6, wherein the trust level is based on one selected from a group consisting of: a popularity of the web source, and a quantity of web sources used.

8. The method of claim 1, wherein a content item created by the first account is promoted in a search result based on the first trust association.

9. A method for establishing a trust association, comprising:
    receiving, by a server and from a client device associated with a first account, a request to verify an association between the first account and a web source, the request comprising a first link to the web source and an identifier associated with the first account;
    identifying, by the server and within the web source, a first authorization tag to associate the web source with the first account;
    comparing, using the first authorization tag within the web resource, an identifier associated with the first authorization tag and the identifier associated with the first account;
    creating, by the server and in response a match between the identifier associated with the first authorization tag within the web resource and the identifier associated with the first account, a first trust association between the first account and the web source to verify the association between the web source and the first account;
    sending, by the server and to the client device, a first confirmation of creating the first trust association; and
    providing, by the server, an indication of the first trust association for display in a user interface of a client device.

10. The method of claim 9, wherein the first authorization tag identifies a first relationship between the first account and a second account.

11. The method of claim 10, further comprising:
    identifying, using the first authorization tag, the first relationship between the first account and the second account;
    confirming, using second account, the first relationship; and
    creating a second trust association between the first account and the second account.

12. The method of claim 9, further comprising:
    locating, within the web source, a second authorization tag associated with a third account; sending, to the third account, a verification association request;
    receiving, from the third account, a second confirmation to the verification of association request; and
    creating a third trust association between the third account and the web source and a second relationship between the third account and the first account.

13. The method of claim 12, further comprising:
    creating a connection graph based on the second relationship.

14. The method of claim 9, wherein the indication of the first trust association comprises an element for a trust level.

15. The method of claim 14, wherein the trust level is based on one selected from a group consisting of: a popularity of the web source, and a quantity of web sources used.

16. The method of claim 9, wherein a content item created by the first account is promoted in a search result based on the first trust association.

17. A system, comprising:
one or more computers; and
one or more storage devices storing instructions that are operable, when executed by one or more computers, to cause the one or more computers to perform operation comprising:
receiving a request to verify an association between a web source and a first account, the request comprising a first link to the web source and an identifier associated with the first account;
accessing the web source in response to the request to verify the association;
locating, within the web source, a first authorization tag to associate the web source with the first account;
creating, in response to source match between an identifier associated with the first authorization tag within the web source and the identifier associated with the first account, a first trust association between the first account and the web source to verify the association between the web source and the first account; and
providing an indication of the first trust association for display m a user interface of a client device.

18. The system of claim 17, wherein the first authorization tag identifies a first relationship between the first account and a second account.

19. The system of claim 18, the server further comprising functionality to:
identify, using the first authorization tag, the first relationship between the first account and the second account;
confirm, using second account, the relationship; and
create a second trust association between the first account and the second account.

20. The system of claim 17, the server further comprising functionality to:
locate, within the web source, a second authorization tag associated with a third account; send, to the third account, a verification of association request;
receive, from the third account, a confirmation to the verification of association request; and create a third trust association between the third account and the web source and a
second relationship between the third account and the first account.

21. One or more non-transitory computer-readable storage mediums comprising instructions stored thereon that are executable by a processing device to perform operations of:
receiving a request to verify an association between a web source and a first account, the request comprising a first link to the web source and an identifier associated with the first account;
accessing the web source in response to the request to verify the association;
locating a first authorization tag to associate the web source with the first account;
creating, in response to a match between an identifier associated with the first authorization tag within the web source and the identifier associated with the first account, a first trust association between the first account and the web source to verify the first account; and
providing an indication of the first trust association for display in a user interface of a client device.

* * * * *

UNITED STATES PATENT AND TRADEMARK OFFICE
CERTIFICATE OF CORRECTION

PATENT NO.        : 10,063,662 B2
APPLICATION NO.   : 14/785627
DATED             : August 28, 2018
INVENTOR(S)       : Ben Ward Page 1 of 1

It is certified that error appears in the above-identified patent and that said Letters Patent is hereby corrected as shown below:

In the Claims

Column 17, Claim 17, Line 31: delete "m" and insert -- in --

Signed and Sealed this
Thirtieth Day of October, 2018

Andrei Iancu
*Director of the United States Patent and Trademark Office*